United States Patent [19]
Bortnick et al.

[11] 3,852,387
[45] Dec. 3, 1974

[54] DOUBLE BELT PLASTIC SHEET FORMING AND TAKE-OFF METHOD

[76] Inventors: Newman M. Bortnick, 509 Oreland Mill Rd., Oreland, Pa. 19075; James W. White, 3308 Christmas Ave., Tuscon, Ariz. 185716; Eddy A. Hazbun, 3 Valley Dr., Leven Rd., Yarm, England

[22] Filed: Aug. 10, 1972

[21] Appl. No.: 279,573

Related U.S. Application Data

[63] Continuation-in-part of Ser. No. 31,704, April 24, 1970, abandoned.

[52] U.S. Cl. .................. 264/40, 264/165, 264/175, 264/210 R, 264/216, 264/237, 264/331
[51] Int. Cl. ........................... B29d 7/14, B29d 7/22
[58] Field of Search ........... 264/212, 216, 165, 166, 264/176 R, 175, 280, 284, 210 R, 237, 331, 40

[56] References Cited
UNITED STATES PATENTS

| | | | |
|---|---|---|---|
| 2,075,735 | 3/1937 | Loomis | 264/175 |
| 2,500,728 | 3/1950 | Williams | 264/175 |
| 2,515,243 | 7/1950 | Lyon | 264/175 |
| 2,537,311 | 1/1951 | Lyon | 264/175 |
| 2,574,588 | 11/1951 | Piperoux et al. | 264/280 |
| 2,791,801 | 5/1957 | Szantay | 264/210 R |
| 3,074,114 | 1/1963 | Petry | 264/175 |
| 3,376,371 | 4/1968 | Opel et al. | 264/216 |
| 3,422,178 | 1/1969 | Junker et al. | 264/51 |
| 3,487,141 | 12/1969 | George | 264/331 |

*Primary Examiner*—Jeffery R. Thurlow
*Attorney, Agent, or Firm*—Michael B. Fein

[57] ABSTRACT

An apparatus utilizing paired endless belts is provided as a low pressure die or sheet forming device and take-off system for forming extruded polymer melts into thermoplastic sheet; said sheet possessing isotropic characteristics, improved dimensional stability, and improved surface characteristics. A method is also provided that included: taking up a strand of extruded polymer melt between endless moving belts; maintaining the region of contact between the melt and said belts at a temperature that allows the melt to adhere to the belts; forming the melt strand into a web of the desired dimensions by compressing, spreading and flattening between said belts; gradient cooling the thermoplastic web between the belts under conditions to provide isotropic properties to the finished thermoplastic sheets before their separation from said belts.

9 Claims, 11 Drawing Figures

FIG. 1

INVENTORS
NEWMAN M. BORTNICK
EDDY ANTON HAZBUN &
JAMES WILLIAM WHITE
BY

ATTORNEYS

INVENTORS
NEWMAN M. BORTNICK
EDDY ANTON HAZBUN &
JAMES WILLIAM WHITE

BY
Arthur R. Eglington
ATTORNEY

DOUBLE BELT PLASTIC SHEET FORMING AND TAKE-OFF METHOD

This is a continuation-in-part of our copending application Ser. No. 31704, filed Apr. 24, 1970, now abandoned.

This invention relates to an apparatus and method for providing improved sheet materials extruded from thermoplastics. In another aspect, it relates to a novel system which takes a thermoplastic polymer extruded at low pressures, and further forms it into a more useful product of desirable surface characteristics, and of improved physical properties.

Broadly stated, this invention further relates to the method of preparing a melt polymer, interposing the melt polymer between two endless belts; the belts having a synchronized movement away from the source of the melt polymer; the belts being held in a position to provide approximately the shape of the plastic extrusion part desired; maintaining the belt surface at the point of the entrance of the melt plastic at a temperature such that the melt polymer adheres to the belt surfaces; providing cooling means in a zone along the belt, and at a rate so as to cause solidification of the thermoplastic, to yield isotropic characteristics and improved physical characteristics; and finally cooling to a temperature such that the plastic sheet readily separates from the belt surfaces.

The plastic contacting surfaces of endless belts may be patterned in any shape desired. However, a preferred embodiment of the invention utilizes a smooth, polished metallic belts to provide flat, optical quality thermoplastic sheet.

Plastic sheet, both flat and in various surface textures such as corrugations, is increasingly useful in architectural applications and as glazing on moving vehicles. The formed plastic sheet may be thermoformed, or vacuum formed, into various shapes to become useful as internally illuminated signs, lighting fixture, skylights, and many other industrial applications.

A well known method for providing thermoplastic stock has been the extrusion process. In this process, a thermoplastic polymer melt, (which does not form a part of this invention), is delivered, by means of a high pressure screw extruder or other polymer melt pump, into a die or fixed body sheet forming device, and is forced through a nozzle at the die exit designed to shape the polymer melt into the general form of the desired cross sectional configuration. The continuous shaped polymer melt is then processed by means of a continuous take-off system.

Several types of extrusion dies are available but they all suffer from one or several deficiencies that impose serious limitations on the rate and quality of the thermoplastic sheet produced, due to one or more of the following reasons: The viscous mass of molten polymer within the die must be subjected to high pressure and high shear forces, in order to induce the required forming pressure at the nozzle of the die. Delivering the polymer melts at such high pressures requires costly heavy duty, high pressure-producing pumping equipment. Furthermore, the high shear forces to which the melt is subjected to at high flow rates creates considerable viscous heat dissipation that causes thermal degradation of the polymer, which is manifested in the extrudate by discoloration and loss of desirable product properties. Several other undesirable defects in the extrudate are induced by the mechanical structure of existing extrusion dies, namely: "melt fracture," "sharkskin," "plate out" and "die swell." These effects are well known to those skilled in the art and are induced by either the high rates of shear or the high temperatures encountered, whenever high molecular weight polymers are processed at increased flow rates. Another problem common to existing extrusion dies is ensuring that the melt leaves the discharge slot at the same speed over the whole width. In order to achieve this, the flow cross-section is restricted by means of a "choke-bar" as wide as the die. The profile of this element has to be adjusted across its width to the material conditions, so that repeated adjustment and correction is necessary.

In addition to the problems associated with the extrusion die, the high back pressure imposed on the system create instabilities in the fluxing and pumping equipment, which also result in a serious defect in the sheet called "flow lines" or "nerve" by those skilled in the art.

The take-off system commonly used today consists of a stand of polishing rolls through which the extrudate from the die commonly passes, such that both surfaces of the extrusion are in contact with the rolls for approximately the same time. (See U.S. Pat. No. 2,791,801). A cooling section may be provided in the form of a table across which the extrusion passes; and a pull rod stand, generally consisting of rubber rollers, which pulls the extrusion through the polishing rollers and away from the extruder.

There are numerous types of take-off systems available, and an example of such a take-off system is described in detail herein. However, in addition to the limitations on extrusion rate and sheet quality induced by existing extrusion dies, further restrictions are imposed on the process by at least one, and generally several deficiencies in the known take-off systems.

By employing take-off systems presently available, the extrusion rate of the system is generally limited by the take-off speed. A simple increase in the extrusion rate may not allow sufficient cooling time, while the sheet is in the polishing rolls and on the cooling table, yielding a poor quality sheet. Furthermore, greater stretching in the take-off direction is virtually inevitable, leading to greater shrinkage in the machine direction (M.D.) than in the transverse direction (T.D.). The molecular weight of the plastic sheets, particularly of poly (lower alkyl methacrylates) is generally desired to be as high as practical to provide the better physical characteristics, in particular, deformation under load at elevated temperatures. In the extrusion and polishing systems presently available, the molecular weight of the thermoplastic which may be processed, is severely limited to minimize poor physical properties in the extruded product, as compared to other processes, such as casting processes. (See U.S. Pat. No. 3,422,178). At higher molecular weight, the shear action in the extrusion die causes orientation and poor surface quality, which cannot be sufficiently compensated for in the polishing rolls. As the molecular weight is increased, the surface of the extrusion becomes roughened, termed by those skilled in this art as the "orange peel" effect. As the molecular weight is further increased, out gassing of unreacted monomer give a roughened surface which cannot be improved on the polishing rolls.

Using presently available techniques, extruded parts are not dimensionally stable; that is, at elevated extrusion temperatures, substantial change of dimension takes place, generally to varying degrees, depending upon the direction of test. It is not uncommon for such an extruded part, when reheated to temperatures still below those used in thermoforming it, to shrink 5 to 10 percent in length along the direction of extrusion; and correspondingly to expand, to shrink to a lesser extent, in the transverse direction. Changes in thickness also can occur. This stability defect in extruded plastic sheet is particularly troublesome to a processor desiring to subsequently thermoform the plastic sheet into commercial forms. This change of shape may also take place under conditions of direct sunlight where heat build up is possible.

Thus, by using standard sheet forming and take-off systems, significant internal stresses are "frozen" into the plastic module during the rapid cooling that takes place, on the polishing rolls and on the other components of the take-off system. These internal stresses cause anisotropic behavior of the extruded part. Mechanical properties, in particular, such as impact resistance and elongation, are adversely affected by these internal stresses. Chemical resistance is poorer, as evidenced by crazing upon contact with various chemicals. Poorer weather resistance outdoors will be experienced. In general, the fast cooling rate necessitated by high production rates leads to poorer physical characteristics. In particular, poor resistance to deformation at elevated temperatures is obtained at high cooling rates.

There are described in the prior art a substantial number of patents which describe apparatus in which paired juxtaposed endless belts are employed for preparation or for polishing of plastics in sheet form. In general, these are useful for converting polymerizable monomer/polymer syrups to cast sheet (e.g., Williams, U.S. Pat. No. 2,500,728; Opel, U.S. Pat. No. 3,376,371; Junker, U.S. Pat. No. 3,422,178;) for polishing preformed extruded sheet (e.g., Piperoux, U.S. Pat. No. 2,574,588); or for converting relatively non-viscous polymer melts and plasticized compositions to sheet form (e.g., Loomis, U.S. Pat. No. 2,075,735; Junker, U.S. Pat. No. 3,422,178; Lyon, U.S. Pat. No. 2,515,243; Lyon, U.S. Pat. No. 2,537,311).

The present invention provides a method for converting unplasticized viscous polymer melts of molecular weight equal to or higher than, and flow characteristics equal to or stiffer than, those currently being processed to sheet by the use of extruder/die/roll technology.

Thus, for example, by this method we have been able to convert poly(methyl methacrylate) sheet of $\overline{Mv} \approx$ 300,000 to sheet of excellent surface quality which exhibits isotropic shrinkage characteristics. By contrast, poly(methyl methacrylate) of $\overline{Mv} \approx$ 200,000, e.g., Plexiglas* V(415) when processed using conventional extruder/die/roll equipment, gives sheet which is hazy, has low gloss, and exhibits on shrinking a large contraction in the machine direction and expansion in thickness and in width.

* the highest molecular weight acrylic molding powder commercially available from Rohm and Haas, Philadelphia, U.S.A.

In the light of the foregoing summary of the state of the art, there is manifestly a need for the novel apparatuses and methods of this invention. Faster rates of extrusion are provided at lower pressures, giving great benefit to the extruding operator.

There is also a great need for plastic sheets having the physical characteristics of that obtained with the process of this invention. Dimensional stability is an important physical characteristic for many applications. For example, the relatively low resistance to deformation at elevated temperatures of polyvinyl chloride, and copolymers thereof, severely limit the utility of this plastic in sheet form. Higher temperatures, such as those occurring in direct sunlight, can cause anisotropic shrinkage, putting great stress on the attachment and seams when the sheet is used in architectural applications.

It is therefore, an object of this invention, to provide means for forming thermoplastic sheet wherein the size and cost of the melt pumping or conveying equipment is markedly reduced over that employed in conventional forming techniques.

It is another object of this invention, to provide a high speed method for forming thermoplastic material into sheet form, free from imperfections caused by excessive shear forces, induced by the extrusion dies ordinarily employed.

It is an additional object of this invention, to provide means for forming thermoplastic sheet wherein the width of said sheet is controlled by adjusting the linear take-off speed and wherein an even flow of melt is maintained across the entire width of the formed polymer web without the use of mechanical restriction means such as a "choke-bar."

It is also an object of this invention, to provide means for extruding thermoplastic sheet of higher molecular weights of acceptable surface and dimensional characteristics at higher linear take-off rates than possible heretofore.

It is a further object of this invention, to produce polished thermoplastic sheets from standard polymer extrusions on the same apparatus allowing wider latitude for the melt temperature of the extrusions that can be processed.

It is yet a further object of this invention, to provide a means for making high surface quality sheets from thermoplastic materials that can be readily adjusted for variations in the thermoplastic composition.

Other objects and advantages will become apparent from study of the following detailed description and accompanying drawings, showing preferred embodiments thereof, wherein the common elements are similarly numbered; but, should not be taken as restrictive of its scope.

Figure 1:
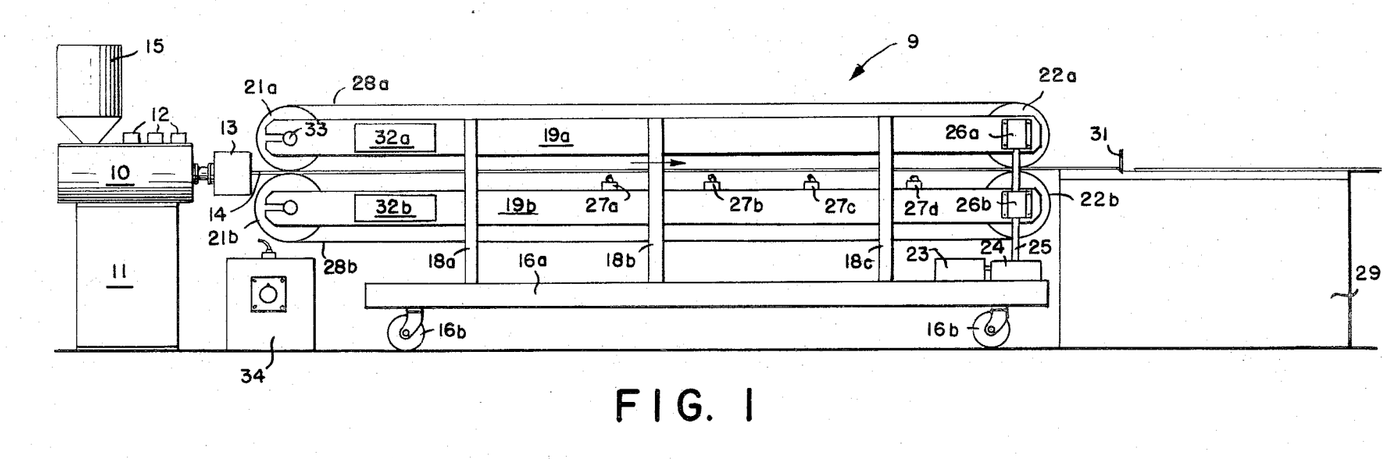
FIG. 1 is a diagrammatic view in elevation of a system constructed in accordance with the present invention.
Figure 5:
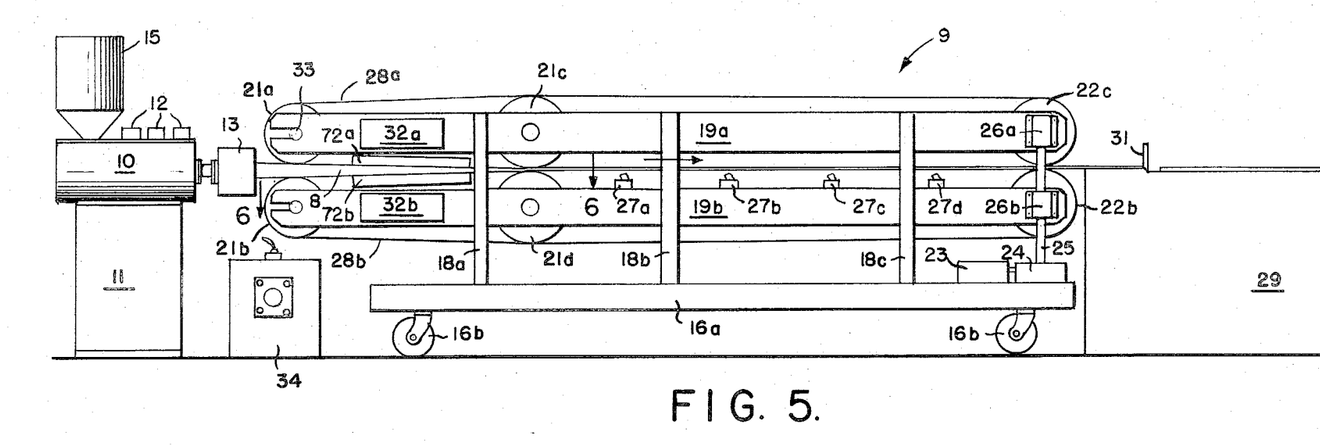
FIG. 5 is a diagrammatic view in elevation of another preferred embodiment of the present invention.

Referring now to the drawings, and initially to FIGS. 1 and 5, the apparatus of this invention for continuously producing thermoplastic sheets having dual polished surfaces, is generally designated by 9. It includes a low pressure single or twin screw plastic extrusion machine 10, supported by a suitable base 11, having optional single or plural venting 12, and designed to deliver the plastic melt at low pressure. An adapter, 13, is conveniently used to produce a continuous extrudate or strand, 14, of a chosen thermoplastic in a temperature range maintained above the transition temperature, but below that at which decomposition occurs. Supplementary venting may be provided to handle the higher molecular weight polymers that may be used herein.

The extruder is provided at one end with a hopper, 15, into which the thermoplastic material, in particulate or molten form, is fed. This material is heated and worked up in the extrusion machine to plasticize and degas the same.

Alternatively, the polymer or copolymer may be synthesized concurrently in a conventional reactor (not shown) and introduced directly, in syrup form, into the extruder feed for degassing and pumping to the adapter, 13. In the case of thermoplastic materials that do not require degassing, the same may be plasticized and worked in a Brabender type mixer and fed directly into the adapter 13. Exemplary recipes of polymer material which may be successively processed in the apparatus of the present invention are set forth herein.

Element 13 consists of a heated adapter, shaped to produce a continuous melt strand of any suitable cross-section that does not induce a significant back-pressure on the melt pumping equipment. This adapter has the function of promptly delivering said melt strand to the inlet side of the double belt sheet forming and take-off system, to avoid significant cooling of said strand, will now be described in detail.

An elongated horizontal frame 16a, optionally supported on casters 16b, serves as the base plate for vertical steel bar supports 18a, 18b and 18c. Positioned within and normal to these supports, are upper and lower belt support members, 19a and 19b, respectively. Member 19a, for example, is disposed in sliding engagement with brackets 20a, 20b and 20c (shown in FIG. 2) which are secured to its external side.

A parallel pair of horizontally arranged and vertically stacked cylindrical rollers, 21a and 21b, are journaled for rotation, and disposed at the sheet take up end (upstream) of members, 19a and 19b. Similarly arranged, are a second pair of cylindrical rollers, 22a and 22b, which are also journaled for rotation within the take-off end (downstream) of the same support members.

An appropriately sized variable speed motor 23 is positioned on frame 16a, the shaft of which motor is mechanically linked to a conventional transmission box, 24. Extending vertically therefrom is a drive shaft 25, which passes through conventional gear boxes, 26a and 26b, engaging and driving the horizontal shafts (not seen) of the take-off rollers, 22a and 22b respectively, which are thereby drivable at variable speeds. This permits sheet linear take-off rates which can be varied over a wide range.

A plurality of air knives, 27a through 27d, using a conventional compressed air source (not shown) are spaced intermediate of both pairs of rollers. They are usually disposed within the belts, preferably in the last third quarter of the belt's horizontal run, and most conveniently within the lower of the endless spring steel belts, 28a and 28b.

Such means are provided to regulate the degree of cooling of the thermoplastic strand 14, if ambient cooling proves inadequate, in order to finally attain a condition below the glass temperature of the sheet at the point of sheet take-off, and further to allow parting of the polished sheet without adherence to either belt. It is quite practical, in certain applications, that ambient temperature will be an adequate means to cool both of said belts, without ancillary mechanical cooling means. Preferably, the distance from the air knife exits to the belt surface, equals about eight times the slot width for maximum cooling.

As the cooled sheet comes off the system, it may be taken up on a storage roller (not shown) assuming it has sufficient flexibility. Alternatively, more rigid sheet may be passed over a cutting table, 29, where a cutting knife, 31, is operated to cut panels of an appropriate linear dimension. The knife may be activated manually or linked to an automatic activating device (not shown).

One of the major difficulties encountered in the use of a flat endless steel band of the size required in the machine of the present invention (such as a feasible belt size being approximately 5 feet wide and from 30 to 250 feet long) is to keep it running true. A steel belt reacts on a pulley in exactly the opposite manner from that of a leather or cloth belt; that is, whereas a leather or cloth belt will always travel to the high side or crown of the pulley, a steel belt will tend to travel to the low pressure side of the pulley.

In accordance with a further feature of the present invention, therefore, provision is made for maintaining a uniform tension on the steel band on both sides of the drive rollers, so that there is substantially no relatively high or low side on the pulley and the belt runs true to a satisfactory degree.

Consequently, air operated take up cylinders 32a and 32b, are provided and secured to the external take-up end of horizontal members, 19a and 19b. They are mechanically linked to take-off roller axles, 33a and 33b. By actuating same, they are used to maintain belt tension within prescribed limits, to compensate for variations in belt length attributable to heating, etc. This feature will be described in greater detail in relation to FIG. 4.

Finally, as schematically depicted in FIG. 1, a control system 34 is provided which conventionally controls three variables: (1) the linear speed of driven rollers 26a and 26b; (2) the volume ratio of air flowing from the air knives 27a through 27d; and (3) the temperature of take-off rollers 21a and 21b, which must be maintained within a gradient ranging ranging from above the glass temperature of the particular plastic being polished, but to below the deterioration temperature thereof.

Figure 2:
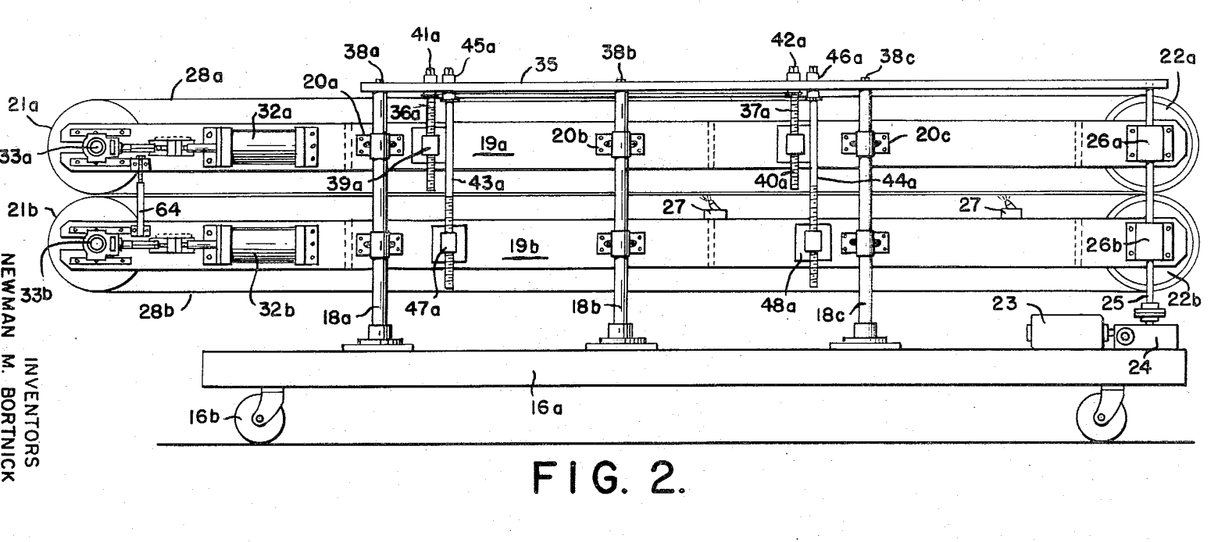
FIG. 2 is a side elevational view of the embodiment for the portable double belt section of the apparatus of this invention of FIG. 1.

As seen in FIG. 2, the double belt section is further provided with an adjustable supporting means to vary the sheet-forming aperture defined by the portions of moving belts 28a and 28b when they are in closest parallel proximity to one another.

Bar support members, 18a, 18b and 18c are secured in rigid position at their upper ends to horizontal solid member 35 by external adjustable locking nuts, 38a, 38b and 38c. The depending lower ends of bars, 36a and 37a are in threaded engagement with brackets, 39a and 40a, respectively, which are also fastened to the outer horizontal surface of upper support member 19a. A like set of threaded bars could be desirably provided on the opposite (hidden) side of members, 19a and 19b, for systems of sufficiently large size. However, this would necessitate welding the steel bands into endless belts after they are mounted on the rollers.

Coordinated adjustment of the position locking nuts, 41a and 42a, permits raising or lowering of the position of member 19a relative to either bracing member 35, or lower roller support member 19b, thereby coarsely varying the aperture defined between the belts as desired.

A second pair of more elongated, at least partially threaded circular bars, 43a and 44a, are also secured at their upper ends to member 35 by locking assemblies, 45a and 46a. Their depending lower ends are in threaded engagement with brackets, 47a and 48a, which are fastened to the surface of horizontal lower support member 19b. Similarly, as with bars 36a and 37a, adjustment of the position of locking assemblies permits variation of the position of lower member 19b, relative to upper member 19a and bracing member 35, with the appropriate effect on the size of the aperture defined by the belts.

The operation of the belt-tensioning means will now be described in connection with FIG. 4. Uniform belt tension is accomplished by the use of the hydraulically interlocked take-up cylinders 32a and 32b, which are mechanically associated with the depicted roller axles 33a and 33b of rollers 21a and 21b, respectively. Another pair of cylinders, 52a and 52b, (FIG. 3) are opposingly mounted on the other side of the system, where they are mechanically linked to the opposing ends of axles 33a and 33b, but this pair are coupled operatively to the first pair.

The cylinders, which are charged with a fluid, conveniently compressed air, from a common source of supply, (not shown) each containing a piston, the external connecting rods 56a and 56b, of which extend to the respective journal blocks, 57a and 57b. These blocks, biased inwardly by the belt tension, slide in horizontally extending rectangular slots, 58a and 58b provided in the take-up end of members 19a and 19b. A pair of shafts, 59a and 59b, extend in fixed relation from blocks in direct or parallel alignment with cylinder rods 56a and 56b. Shafts 59a and 59b, which terminate as thread pins, 60a and 60b, threadingly engage threaded transverse bars, 61a and 61b, which slideably engages the walls of horizontal slots 62a and 62b support members 19a and 19b.

Shafts 56a and 56b are also provided with threaded ends, 63a and 63b, that engage tension-adjusting bar 61a and 61b. These transverse bars permit a basic setting of the position of the roller axles 33a and 33b, in their respective slots, before belt start up. During operation, finer variation in belt tension is thus accomplished by varying the air within the air cylinders, effecting a compensating movement of the journals through the linkage just described.

The unevennesses in the length of the belt are generally fully compensated by adjustment of the position of the roller axles, with the result that the tension on the belts is maintained substantially uniform along the length of its run, and the tendency of the belt to travel to a low pressure side of the roller is obviated.

It will be apparent that the pistons in the several cylinders move synchronously with each other in a horizontal plane, while maintaining a variable outward bias at all times on the roller axles. As all of the cylinders are supplied with a fluid medium under the same pressure, and as all of the pistons are of the same diameter, the source pressure of the rollers against the belts is maintained uniform.

In addition to irregularities in the fabricated steel band, the take-up mechanism will allow also for the expansion and contraction of the belts as they become heated during the operation of the machine, or cooling down on stoppage of the machine.

In one prototype installation, two spring bands were fabricated into endless belts. Previous to installation, the belts had been polished with No. 600 silicon carbide paper in Petroleumether (BP 450°F.), yielding a medium gloss finish. To obviate a joint where the steel bands were joined, a welded seam was employed.

Figure 3:
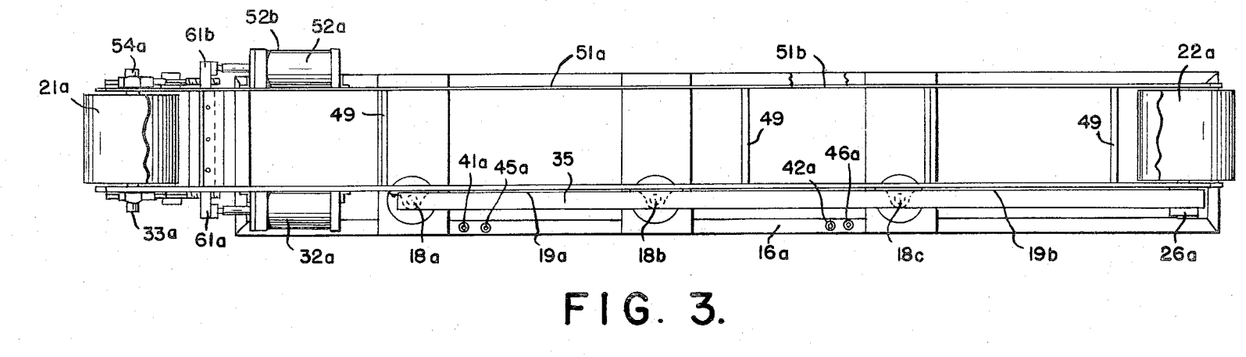
FIG. 3 is a top plan view of the portion of the apparatus illustrated in FIG. 2.
Figure 4:
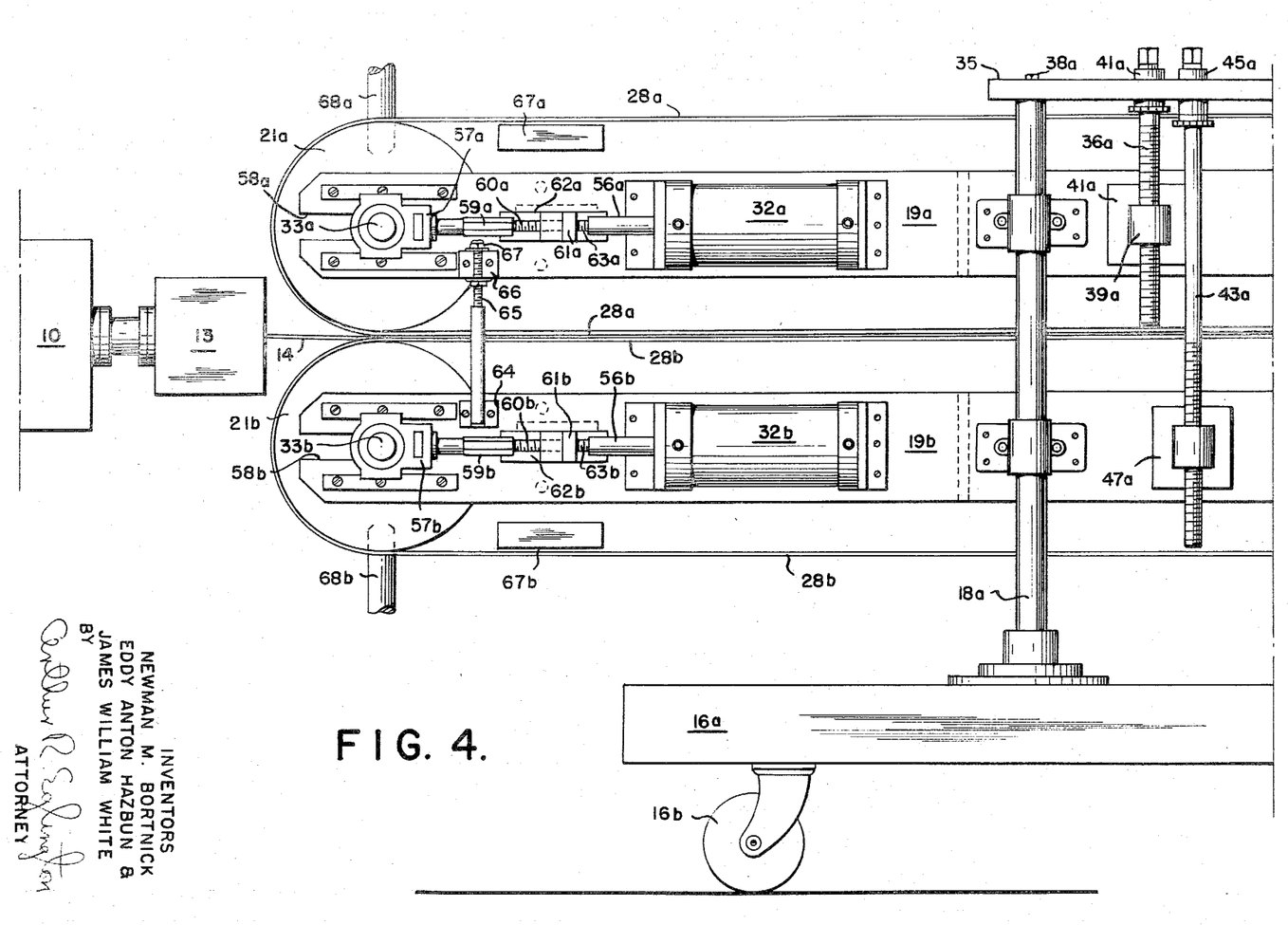
FIG. 4 is an enlarged elevational view of the upstream portion of the apparatus of FIG. 2 utilized in forming and pressing the sheet.

By reference to the top plan view of FIG. 3, the upper belt 28a being broken away to reveal internal structure, there are shown certain of the companion elements on the formerly hidden side of the system, which support the belts, maintain the belt aperture, and the requisite belt tension. Plural metal ribs 49 are provided to maintain, in spaced apart relation, the upper horizontal support members 19a and 51a, lower support members, 19b and 51b, upper air cylinders, 32a and lower cylinders, 32b and 52b.

Secured to lower member, 19b is an internally threaded rod 64 (best seen in FIG. 4) with a threaded shaft 65, projecting upwardly therefrom and into threaded engagement with a second bracket 66, which is rigidly mounted on upper member 19a. A locking nut assembly 67 is provided on either side of bracket 66 to secure shaft 65 in an adjustable, but maintainable, position. This device ensures a finer aperture adjustment near the take-up end of the aperture defined by the converging belts.

Means are conveniently provided to adjustably heat the intake rollers within a temperature gradient ranging from above the glass temperature of the thermoplastic material being polished, but further limited to avoid reaching the deterioration temperature thereof. For maximizing the effectiveness of the disclosed double belt system in polishing the sheet surface, the belt should preferably be as hot as the extruded sheet itself at the point of take up by the roller nip.

Optionally, each belt may be preheated at a point just prior to its moving onto the intake rollers 21a and 21b, by appropriately positioning there electrical heaters, 67a and 67b, within the belts. They are conveniently secured to the horizontal surfaces of frames 19a and 19b.

Preferably, rollers 21a and 21b, are continuously heated to insure an adequate belt take-up temperature, and also eliminate heat loss of preheated belts, as they come into contact with the roller surfaces. A hot oil system is conveniently employed to heat the rolls. The controlled temperature-heated oil is introduced into each roller by insulated concentric dual pipe conduits, 68a and 68b, enter through the inner pipe, circulating within and being withdrawn via the annular spaced defined by the outer wall. This approach permits good temperature control of the rollers, typically maintained at 400°F.

Sheets of uniform shrinkages were obtained consistently when processing a continuously extruded poly (methyl methacrylate) sheet.

The take-up end rolls were fabricated from mechanical tubing and are internally baffled, being 12 inches in diameter and having a 6.0 inches wide face. The drive rolls, 22a and 22b, are of the same dimensions, but are of steel and are provided with a 1.0 inches facing of Neoprene (Shore Hardness = 80). To insure belt tracking, they are crowned by providing inward taper running 1.5 inches from each circular edge, and being 0.010 inches in depth at the periphery of the roller face.

The take-off rolls on the prototype double-belt system are heated to the desired temperature (400°F.) by a hot oil system as noted earlier. During the heat-up period, the belts are under tension and moving at a slow rate (5.0 inches/minute). When the reactor and the extruder are ready and the belt rolls are up to temperature, the belt is moved into position, and the polymer exiting from the die is guided onto the bottom roll. The belt speed is adjusted to conform with the polymer rate such that there is a minimal bank of polymer on the rolls. During this belt start-up period, the belt is cooled by two air knives (27a and 27b) located about midway on the belt. When the belt operation has been stabilized, the cooling is adjusted to maintain the desired temperature in the cooling section of the belts. At the end of a run, the melt feed is shut off and heating of the take-off rolls is discontinued while cooling is maintained. When the rolls and the belt are at ambient temperature, the belt may be stopped, and protective papers are placed between the belts before the tension on the belts is released.

In order to obtain a good sheet surface, the polished sections of the belts have to move strictly on top of each other, as long as they are in contact with the extruded sheet. This is achieved by: (1) Driving both belts with rubber rollers which themselves are driven with the same chain; (2) Suppressing lateral movement of both belts by guiding them between rollers on the rear side before they contact the idler rolls; (3) Maintaining belt tension in order to avoid slipping of the belts, when they are heated and, consequently, expand.

The models described herein are supported entirely from one side. It is entirely feasible, and is even preferred for systems in which the belts of larger widths are employed; e.g., up to 12 feet in width, to support the rolls and belts from two sides. It is feasible to perform the final welding of the belts, and to polish them while they are mounted on the machine. Alternatively, one may employ demountable supports for the second side so that cantilevering is limited to periods of assembly and disassembly in the absence of substantial tension on the belts.

Similarly arranged in the alternative embodiment of FIG. 5 is an intermediate pair of cylindrical rollers, 21c and 21d, which are journaled for rotation at a suitable distance from the front end of the support members. At the downstream end of the same support members is another pair of similarly journaled cylindrical rollers 22a and 22b. In the embodiment of FIG. 5, the first said pair of rollers 21a and 21b are sized at a smaller diameter than the other two pairs of rollers so that an initially converging section 8 is defined within the endless belts 28a and 28b.

For the embodiment initially depicted in FIG. 5, the control system 34 is provided which conventionally controls the main operating variables: (1) the linear speed of the driven rollers 22a and 22b; (2) the volume rate of air flowing from the air knives 27a through 27d; (3) the temperature of the front rollers 21a and 21b; (4) the temperature of the belt support platens 72a and 72b; and the temperature of the intermediate rollers 21c and 21d. These temperatures (3 and 4) must be maintained within a gradient ranging from above the glass transition temperature of the particular plastic being processed, but to below the deterioration temperature thereof.

In the embodiment of FIG. 5, the initially converging section 8 defined within the double belts performs the function of a conventional extrusion die. The plastic melt strand 14, issuing from adapter 13, is taken up between the nip of the front heated rollers 21a and 21b and is gradually compressed, spread and flattened within the tapering aperture, so that when the melt strand reaches the nip of the second pair of heated rollers 21c and 21d it can spread almost to the outer edges of the pair of belts. The final sheet width is determined by both the volumetric flow rate of the melt issuing from adapter 13, and the linear speed of the dual belts. Thus, at a fixed volumetric flow rate, the linear take-off speed can be adjusted to produce sheet of any desired width that is greater than the width of the feed strand but less than that of the dual belts. The dimensional changes undergone by the strand feed 14, are better seen in the partial top plan view of FIG. 6 which diagrammatically illustrates the transformation undergone by the strand feed 14, for three different settings a, b and c of the tapering aperture in the sheet forming section. The completely flattened strand emerges into the substantially parallel cooling section of the belt run.

Figure 9:
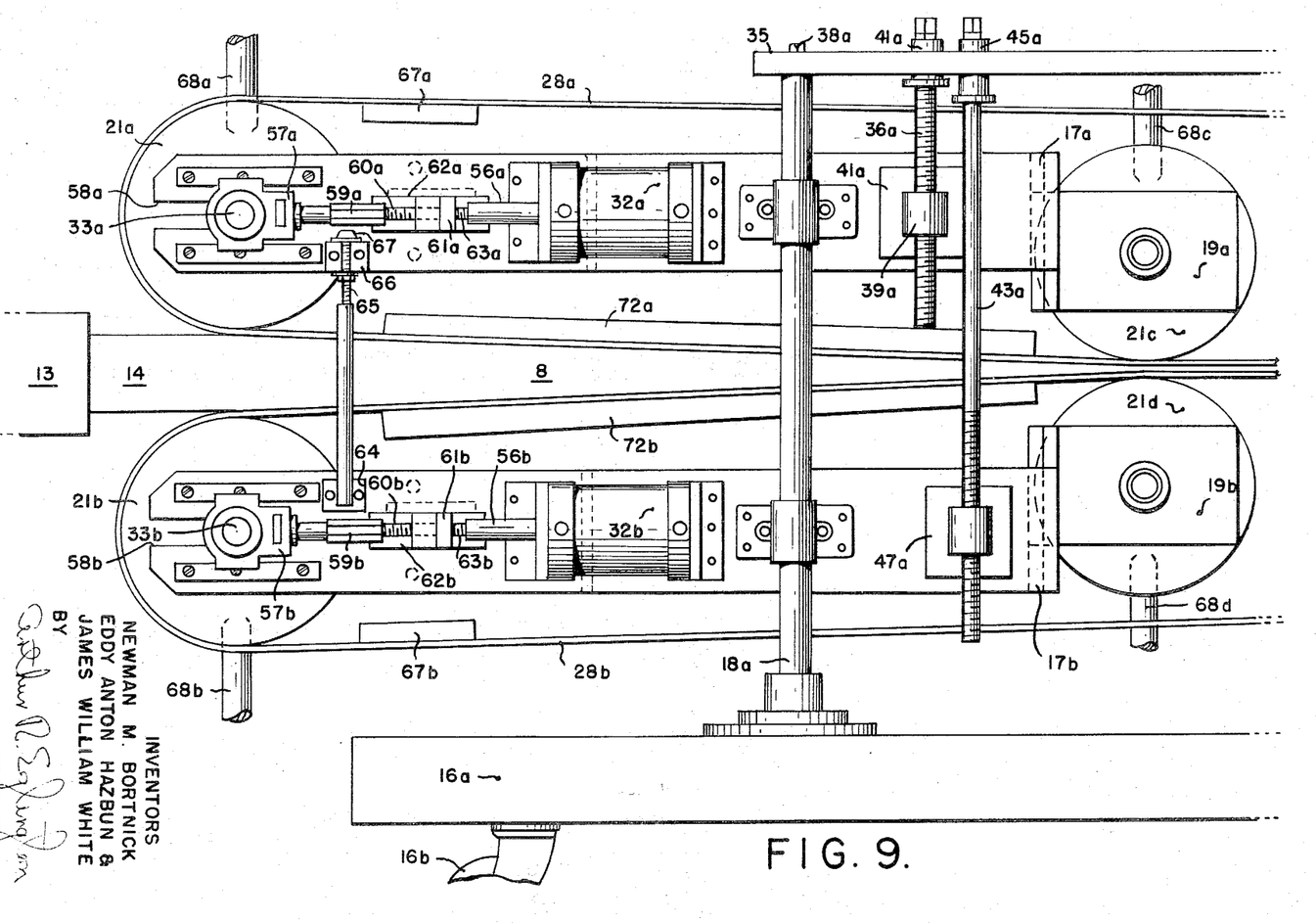
FIG. 9 is an enlarged elevational view of the upstream portion of the apparatus of FIG. 7 utilized in forming and pressing the sheet.
Figure 10:
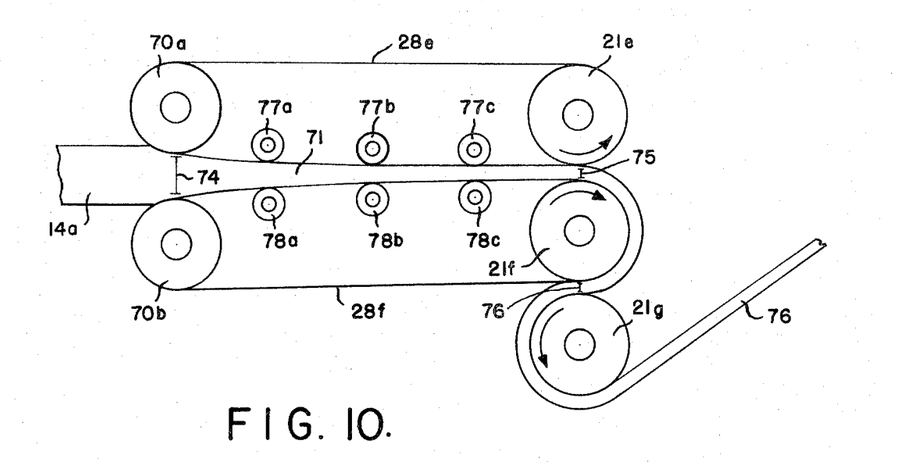
FIG. 10 is a schematic view in elevation of another embodiment of the present invention.
Figure 11:
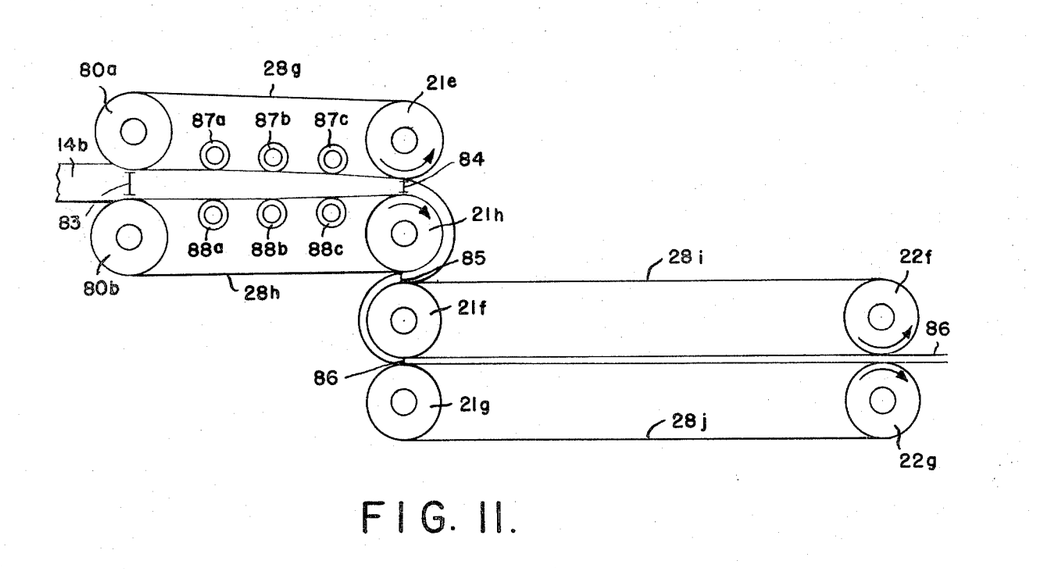
FIG. 11 is a schematic view in elevation of yet another embodiment of the present invention.

The support plattens 32a and 32b are positioned adjacent to the converging section of the dual belts, and intermediate to the aforementioned pair of intake rollers. These platens serve to support the walls of the converging belt section against the pressure of the polymer, which may tend to bulge this section of the belt run. These platens may be straight, as shown in FIGS. 5 and 9, or optionally curved to impart an optimum curvature to the belts in the converging section. This optimum curvature is adjusted to suitably control the rate of flattening and spreading of the melt strand 14, so as to equalize the stresses on the polymer melt as it is formed into sheet. They also may be optionally heated, conveniently by adjacent or internally cast electrical heaters, or circulating oil heaters. At high linear belt speeds, these platens may be fitted with a lubrication lining made of bearing metal or reinforced Teflon to provide a low coefficient of friction between the belts and said platens. Alternatively, the support platens may be replaced by adjustable rolls as described below in connection with yet other embodiments of this invention as illustrated in FIGS. 10 and 11. In order to make sheet in thicknesses varying over a desirable range, the double belt section is further provided with an adjustable supporting means to vary the sheet-forming aperture defined by the portions of moving belts 28a and 28b when they are in closest parallel proximity to one another.

Bar support members, 18a, 18b and 18c are secured in rigid position at their upper ends to horizontal solid member 35, by external adjustable locking nuts, 38a, 38b and 38c. The depending lower ends of bars, 36a, 37a and 37b are in threaded engagement with brackets, 39a, 40a and 40b, respectively, which are also fastened to the outer horizontal surface of upper support member, 19a.

Coordinated adjustment of the position locking nuts, 41a, 42a and 42b, permits raising or lowering of the position of member 19a, relative to either bracing member 35, or lower roller support member 19b, thereby varying the aperture defined between the belts as desired.

A second pair of more elongated, at least partially threaded circular bars, 43a, 44a and 44b, are also secured at their upper ends to member 35, by locking assemblies, 45a, 46a and 46b. Their depending lower ends are in threaded engagement with brackets, 47a, 48a, and 48b, which are fastened to the surface of horizontal lower support member, 19b. Similarly, as with bars 36a, 37a and 37b, adjustment of the position of locking assemblies permits variation of the position of lower member 19b, relative to upper member 19a, and bracing member 35, with the appropriate effect on the size of the aperture defined by the belts.

Figure 7:
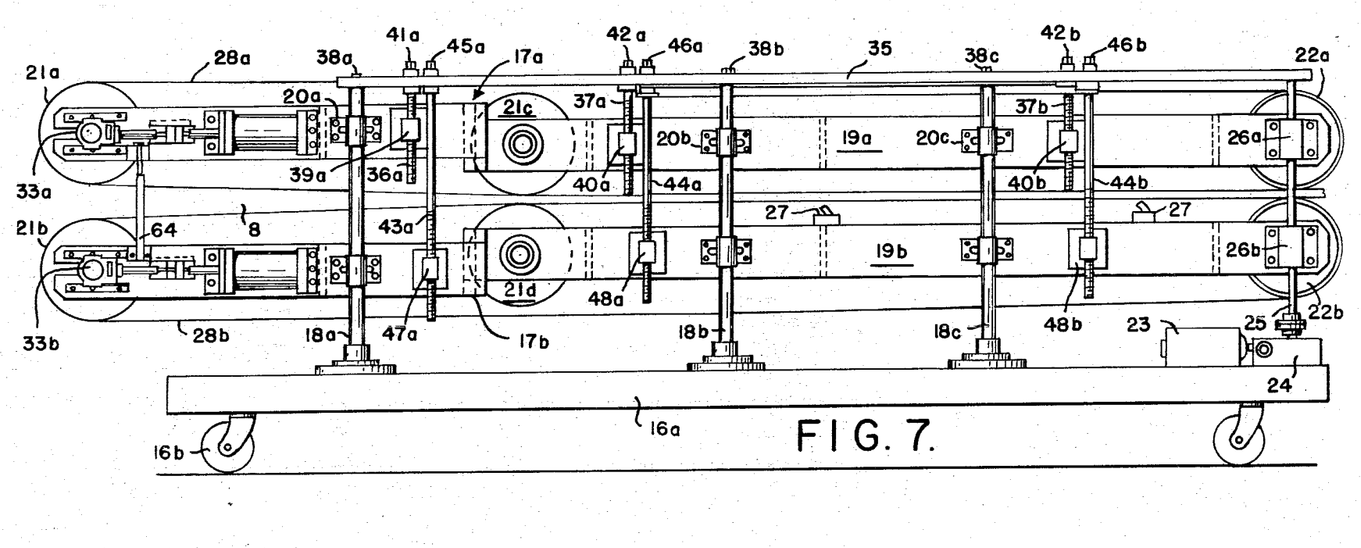
FIG. 7 is a side elevational view of another preferred embodiment for the portable double belt section of the apparatus of this invention.
Figure 8:
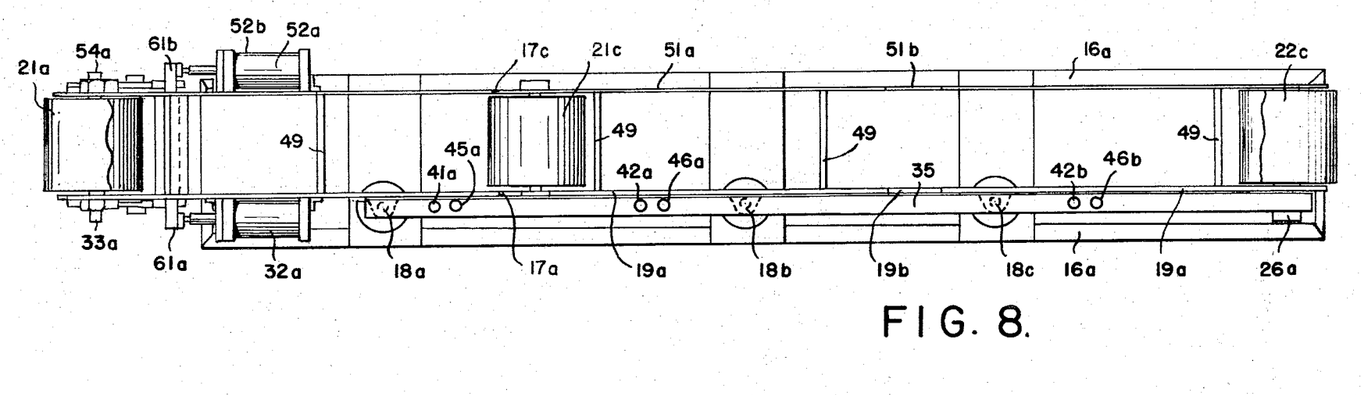
FIG. 8 is a top plan view of the apparatus illustrated in FIG. 7.

In addition to means for varying the sheet forming aperture in the embodiments of FIGS. 1 and 5, in the latter, adjustable means are provided to vary the intake aperture of the converging section defined by the clearance at the nip of the front pair of rollers 21a, and 21b. As shown in FIGS. 7 and 8, lubricated miter joints 17a, and 17b, in upper and lower support members, 19a and 19b, allow the adjustment of the position locking nuts 41a and 45a, independent of 42a, 42b, 46a and 46b. This permits raising or lowering the position of the front sections of support members 19a and 19b, without altering the sheet forming aperture. Consequently, the vertical positions of the upper and lower intake rollers, 21a and 21b, can be adjusted to the desired intake aperture within a range equal to or smaller than the thickness of the melt feed strand, 14. This adjustment is more easily carried out while the tension on the dual belts is released.

Preferably, rollers 21a, 21b, as well as 21c, 21d, of FIG. 9, are continuously heated to insure an adequate belt take-up temperature, and also eliminate heat loss of preheated belts, as they come into contact with the roller surfaces. A hot oil system is conveniently employed to heat the rolls. The controlled temperature-heated oil is introduced into each roller by insulated concentric dual pipe conduits, 68a, 68b, as well as 68c, 68d of FIG. 9, entering through the inner pipe, circulating within and being withdrawn via the annular spaced defined by the outer wall. This approach permits good temperature control of the rollers, the front pair is typically maintained at 350°–550°F. and the intermediate pair at a slightly lower temperature.

In a prototype of the double-belt system, of FIGS. 7–9, the front and intermediate pair of rolls were fabricated from mechanical tubing and are internally baffled, being 12.0 inches in diameter and having a 16.0 inches wide face. The drive rolls, 22a and 22b, are of the same dimensions, but are of steel and are provided with a 1.0 inches facing of Neoprene (Shore Hardness = 80). To insure belt tracking, they are crowned by providing inward taper running 1.5 inches from each circular edge, and being 0.010 inches in depth at the periphery of the roller face. In a series of demonstrations, the intake rolls on this prototype system were heated to the desired temperature (400°F.) by means of a hot oil system as described herein. During the heat-up period, the belts are under tension and moving at a slow rate. The sheet forming operation is conducted such as described above in connection with the prototype of FIG. 1. At the end of the heat-up period, the belt is moved into position to take up a formed plastic strand, 14, which issues from a low pressure 2 ½ inches single screw extruder at 50–300 lbs/hr and at substantially atmospheric pressure. The strand is taken up into the entrance of the sheet forming section which is set at an aperture not less than the thickness of the sheet and not greater than the thickness of the strand, typically 0.1–2.0 inches. The belt speed is adjusted to conform with the polymer rate such that there is the desired bank of polymer on the rolls. The melt web is gradually flattened by the narrowing aperture in the converging section until it spread to a width of 16 inches at the nip of the intermediate rolls which are set to give the desired belt clearance. The transformation of the melt strand into a thin flat sheet is now complete, and the polished, but still hot plastic sheet, emerges into the cooling section of the belt run.

Yet another embodiment of the present invention, by which to accomplish extrusion of polished plastic sheet using converging double belts is schematically depicted in FIG. 10.

A polymer melt is fed as a strand 14a to a pair of converging belts, 28e and 28f, which are supported on vertically stacked intake rollers, 70a and 70b, that are preferentially heated as earlier described. The initial nip aperture 74 is set at a value lower than the thickness of the strand 14, but greater than the desired thickness of the sheet. As before, these rollers take up the melt strand and provide the initial compression, spreading and strand flattening.

Spaced downstream, is a set of three vertically stacked rollers, 21e, 21f and 21g, which are similarly heated to maintain the partially flattened rope in a melt condition, at it passes between the usually smaller nip 75 of the topmost rollers of the set. The upper pair, 21e and 21f, thus define an initial converging section 71 within the intake end of the double belts, functioning as a die.

The fully flattened rope emerges over and around the open side of middle roller 21f, with a reduced thickness that is variable from 0.02 inches to 0.50 inches. This is accomplished by varying the aperture between rollers, 21e and 21f. Polishing of the formerly lower side of the sheet is achieved by this roller.

The sheet passes through nip 76, defined by lower pair 21f and 21g, and around roller 21g, whereby the formerly upper side of the forming sheet is polished. The nip of this pair may also be set smaller than upper nip 75, to effect additional compression and reduced gauge for the polished sheet, which then disengages from the lower arc of bottom roller, 21g. The separated formed sheet 76, is air cooled as it passes on to a saw (not shown), where it is cut in the usual fashion for sheet, which is normally formed and patterned by means of a three roll polishing stand.

Optionally, a plurality of rollers, typically a stand of three on the topside, 77a, 77b, and 77c, and three bottomside of 78a, 78b, and 78c, are adjustably positioned adjacent the converging section of the dual belts and intermediate to the aforedescribed sets of intake rollers.

Figure 6:
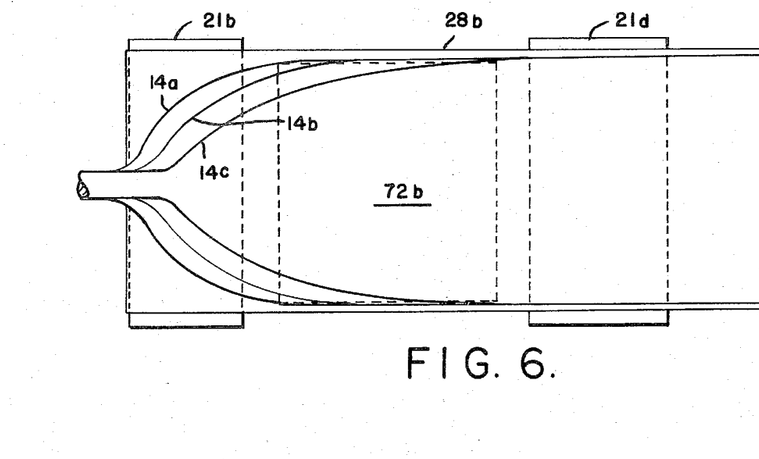
FIG. 6 is a top plan view of a portion of the diagrammatic embodiment taken along line 5—5 of FIG. 5.

As with the platens, 72 a and b, in the embodiment of FIGS. 5 and 9, these rollers serve to support the walls of the converging section of the dual belts against the back pressure of the pressed polymer melt. This back pressure is substantially atmospheric in proximity of the front rolls, it then rises gradually in the converging section until it reaches a high peak on the upstream side of the second pair of rolls 21e and 21f, it then drops back to atmospheric pressure as the melt sheet emerges downstream from the nip of the same rolls. In order to distribute the pressure evenly in the sheet forming section, the support rollers are adjusted to impart an optimum curvature to the dual belts in the converging section. This is best achieved in loading the support rollers by means of a hydraulic mechanism, (not shown). The pressure on each opposing pair of rollers is maintained at a desired value which is increased gradually in the direction of flow. This scheme has the desired effect of automatically imparting the desired curvature to the tapering section of the belts under a wide range of operating conditions. Typically, the most even pressure distribution is achieved when the cusp shaped cylindrical region in front of the intake rollers 70a and 70b forms a contiguous part of the tapering flow geometry as shown in FIG. 10. Thus, partial spreading of the melt feed strand takes place at the nip of the rolls prior to entering the converging section of the dual belts. The dimensional changes undertaken by the strand feed in such a flow geometry are illustrated in FIG. 6.

The support rollers may be conventionally heated, as are the larger rollers, either by circulating oil, or by electrical elements disposed within these rollers. Another advantage of plural support rollers is that they permit friction-free passage of the converging belts across their surfaces.

The third roll, 21g, may have a patterned engraved surface such as a matte or a hair cell pattern, if desired, or a patterned transfer paper may be fed to the nip formed by the bottom belt and the third roll to form a patterned top surface in the emergent sheet. This technique has the advantage of permitting shorter belts to be employed, and of not requiring cooling and reheating of the belts. It does not give sheet which approaches isotropic shrinkage properties as well as does belt-cooled sheet, because stretch in the machine direction after parting from the second roll stand is difficult to avoid.

The technique is particularly useful for preparation of thin sheet, whereby such high linear rates are achieved that belt cooling and reheating become the overall rate determining steps. Application to the composition of later Example 9 is particularly useful in the 10–100 mil thickness range.

Yet another embodiment shown in FIG. 11 operates with the sheet forming section of the double belts detached from the cooling and sheet polishing section. The melt strand, 14b, is fed into the nip 83, of heated intake rollers 80a and 80b, it is then pressed within the adjustable tapering section defined by dual belts, 28g and 28h, and emerges as a partially flattened melt sheet, 84. The support rollers 87a, 87b and 87c, and 88a, 88b, 88c, act in the same fashion as the support rollers in the embodiment of FIG. 10. The sheet forming belts are synchronously driven by drive rolls, 21e and 21h. The melt sheet is further compressed within the nip 85, formed between rolls, 21h and 21f, and is guided into the adjustable take-off aperture 86, formed by the substantially parallel second pair of dual belts, 28i and 28j, which are driven synchronously by drive rolls, 22f and 22g.

As in the embodiment of FIG. 10, this technique also eliminates the need for cooling and reheating of the belts and it further provides belt cooled sheet which approaches the isotropic shrinkage properties obtained, using the embodiment of FIGS. 1 and 5. In addition, this configuration allows the use of unpolished belts in the sheet forming section of the apparatus. Furthermore, it permits the use of cooled rollers instead of air knives for cooling the sheet in the polishing and take-off section of the apparatus.

EXAMPLE I

A series of runs is conducted, using a prototype model of the embodiment described in FIG. 1 with 6 inches wide dual belts. Extrusion of a polymer of methyl methacrylate with ethyl acrylate (98/2 weight ratio) of about 300,000 MW, far higher than can be handled under conventional extrusion conditions, is conducted with melt temperatures of 500°–575°F. and roll temperatures of 390°–400°F. (the oil temperature was set at 425°F). Further data for the runs are shown in Table I.

TABLE I

PRODUCTION OF SHEET WITH THE POLISHED BELTS

| Run No. | Est. MDC | Belt Speed, ins./min. | Width ins. | Sheet Thickness. (mils) | | | Shrinkage, %[1] | |
|---|---|---|---|---|---|---|---|---|
| | | | | Left | Center | Right | MD | TD |
| A | 1.04 | 11.0 | 5.5 | 126 | 128 | 126 | 1.78 | 1.95 |
| B | 1.01 | 11.5 | 5.5 | 126 | 128 | 124 | 1.93 | 1.73 |
| C | 1.04 | 10.75 | 5.75 | 125 | 128 | 125 | 1.67 | 1.86 |
| D | 0.99 | 6.75 | 5.25 | 142 | 136 | 132 | 1.52 | 1.46 |
| E | 0.98 | 5.75 | 6.0 | 126 | 130 | 129 | 1.60 | 1.45 |

[1] Oil temperature was set at 425°F., the temperature on the side of the rolls as measured by a contact thermocouple was 390–400°F.

TABLE II

PHYSICAL PROPERTIES OF EXTRUDED SHEET MATERIALS, SURFACED AND COOLED BY THE KZ ENDLESS BELT

|  |  | A | B | C | D |
|---|---|---|---|---|---|
| Belt Temperature at Roll Nip, °F |  | 450 | 450 | 500 | 500 |
| Post Shrinkage, % |  |  |  |  |  |
| Machine Direction (MD) |  | −0.88(0.5) | −1.20(2.20) | −0.19 | −0.35 |
| Transverse Direction (TD) |  | −0.83 | −1.10 | −0.18 | −0.45 |
| Measuring Temp., °C |  | 150 | 150 | 185 | 210 |
| DTUL at 264 psi, °C | (MD) | 90 | 84 | 134 | 164 |
|  | (TD) | 90 | 84 | 134 | 164 |
| Temperature at 0.1% shrinkage, °C | (MD) | 89 | 88 | 140 | 148 |
|  | (TD) | 89 | 88 | 140 | 150 |
| Flexural Properties |  |  |  |  |  |
| Strength at Maximum, psi | (MD) | 12,770 | 9195 | 15,120 | 15,180 |
|  | (TD) | 13,490 | 279,100 | 14,900 | 15,200 |
| Modulus of Elast., psi | (MD) | 452,890 | 276,580 | 360,040 | 332,000 |
|  | (TD) | 462,200 | 277,020 | 349,900 | 333,700 |
| Charpy Unnotched Impact (ft-lbs/ ½" × 1") 23°C | (MD) | 8.0 |  |  |  |
|  | (TD) | 7.3 |  |  |  |
| Izod Notched Impact (ft-lbs/in.) 23°C | (MD) | 0.3 | 1.9 | 14.8 | 1.7 |
|  | (TD) | 0.4 | 2.4 | 13.1 | 1.9 |
| Izod Notched Impact (ft-lbs/in.) 0°C | (MD) |  | 0.9 | 10.7 | 0.9 |
|  | (TD) |  | 0.9 | 11.7 | 1.7 |
| Tensile Impact (ft-lbs/inch$^2$) 23°C | (MD) | 36 |  |  |  |
|  | (TD) | 32 |  |  |  |
| Izod Unnotched Impact (ft-lbs/ ½" × 1") 23°C | (MD) | 6.0 |  |  |  |
|  | (TD) | 5.0 |  |  |  |

EXAMPLE II

A pelletized blend of 65 parts of poly (vinyl chloride), a commercially available moderate molecular weight PVC Diamond Alkali No. 35, and 35 parts of a copolymer of methyl methacrylate (MMA) and isobornyl methacrylate (IBOMA) (60/40 weight ratio), stabilized against thermal decomposition with 2 parts of a commercially available tin containing stabilizer, Advastat-TM 180, and containing 0.5 part of stearic acid, is extruded by means of a single screw extruder at a melt temperature of 385°–395°F. and processed by means of a prototype of the apparatus shown in FIG. 5. The belt temperature is held at 456°F. at the first roll nip. Properties of the sheet so obtained are shown in column A of Table II.

EXAMPLE III

In the same manner as described in Example II, a blend which differs only in that half of the MMA/IBOMA copolymer is replaced with a three-stage acrylic rubber impact modifier, the preparation of which is described in the following procedure:
Procedure I To a suitable reactor kettle fitted with a stirrer, condenser, holding tank, and means for bubbling inert gas through the reaction mixture, there are charged 534 parts deionized water, 0.14 part sodium lauryl sulfate and 0.28 part sodium persulfate. After the solid materials have dissolved, 56.3 parts n-butyl acrylate and 0.28 part 1,3-butylene diacrylate are charged. Nitrogen is bubbled through the stirred mixture and the batch is heated to 60°C. When polymerization begins the nitrogen sparge is stopped and a very slow nitrogen sweep is maintained over the liquid. After 45 minutes from the incidence of polymerization at 60°–65°C., a solution of 1.25 parts sodium lauryl sulfate is added as a 15 percent solution in deionized water. The batch is stirred for 5 minutes and a mixture of 248 parts n-butyl acrylate and 1.23 parts 1,3-butylene diacrylate is added. In small batches this charge may be added in one shot, but under production conditions the addition may take 1 to 2 hours. During this addition the temperature is maintained in the range of 70°–80° C. (end of stage I). The stirring is continued for 15 minutes after the monomer charge addition has been completed. The mixture is then cooled to 50°C.

A sample of the emulsion at the end of stage I (15 minutes after the addition of n-butyl acrylate and 1,3-butylene diacrylate has been completed) is found by standard light scattering techniques to have a particle diameter of 2,095 A as measured with blue light. There is charged 195 parts deionized water and 0.42 part diisopropylbenzene hydroperoxide (supplied as 54 percent in benzene). Five minutes after this charge has been added, 0.42 part (supplied as a 10 percent aqueous solution) of sodium formaldehyde sulfoxylate is added. Five minutes later a mixture of 82.6 parts styrene monomer and 1.69 parts divinylbenzene (40–60 percent active) is added. The temperature of the batch is maintained in the range of 50°–55° C. for 1 hour and then raised to 75°C. and held for 30 minutes (end of stage II).

A mixture of 79.1 parts isobornyl methacrylate and 79.1 parts methyl methacrylate is charged and the batch is held for 1 hour at 70°–80°C. (end of stage III). The batch is then cooled to 50° C., filtered through cheesecloth, and the modifier is isolated by spray drying. The sheet is glossy and smooth, and exhibits isotropic shrinkage and impact properties as shown in column B of Table II.

EXAMPLE IV

In the same manner as described in Example I, a commercially available polycarbonate resin (Lexan 101, General Electric Company) is extruded at a melt temperature of 600°–650°F. and collected on the belts at a belt temperature of 500°F. at the first roll nip. The sheet has excellent appearance, the surface of which mirrors that of the polished metal belts and exhibits isotropic properties as can be seen in column C of Table II. Similarly acrylonitrile/butadiene/styrene (ABS) plastics, and poly (phenylene oxide)/polystyrene blends are converted to sheet.

EXAMPLE V

In the same manner as described in Example I, poly [2,2-bis (4-hydroxyphenyl) propane isophthalate] prepared as described in U.S. Pat. No. 3,329,653 is extruded at a melt temperature of 650°–700°F. and collected on the belts at a temperature at the first roll nip of 500°F. Sheet appearance is excellent and the properties are shown in column D of Table II and are seen to be isotropic. In a similar fashion, Polysulfone and poly (phenylene oxide) are converted to sheet with isotropic properties. Operating the belt temperatures at higher belt temperatures at the nip (e.g., 600°–700°F.) gives sheet of higher gloss than those prepared at 500°F.

EXAMPLE VI

A blend of 80 parts of poly (vinyl chloride), a commercially available high molecular weight PVC, (Diamond Alkali 500); 20 parts of an acrylic impact strength modifier of the type described in U.S. Pat. No. 3,426,101; 2 parts of a commercially available tin-containing vinyl stabilizer; Advastab FM-180 and 0.5 parts of stearic acid is extruded as described in Example I. When a linear rate of a ca. 1 foot/min. is employed and cooling of the belts beyond the nip occurs under ambient conditions, ⅛ inch thickness sheet is produced which exhibits isotropic shrinkage (4.0 percent in both MD and TD after heating for 10 min. at 400°F.), essentially isotropic Izod impact strength (18 and 21 ft-lbs/in of notch in MD and TD, respectively), and a DTUL of 71°C. (264481). When intense air knife cooling is introduced, the shrinkage becomes anisotropic (7.5 percent and 1.5 percent in the machine and transverse directions, respectively), the DUTL drops ca. 1°C, but the impact strength remains unchanged. When the same composition is extruded, using a prototype of the alternate embodiment as shown in FIG. 5, the properties of the sheet are isotropic and are essentially those of the former, the clarity is improved. This is the case whether or not forced cooling or ambient cooling is employed beyond the second roll nip.

EXAMPLE VII

The copolymer of Example I is extruded by means of a twin screw devolatilizing extruder and collected by means of a prototype of the device employed in Example II. The speed and separation of the belts are adjusted to collect the product. By this means, sheet as thin as 10 mils (0.010 inch) and as thick as 500 mils (0.500 inch) is produced with surfaces in each instance which mirror those of the polished belts.

EXAMPLE VIII

The procedure of Example VI is repeated, but there is employed 20 parts of an impact modifier of the butadiene/styrene/methyl methacrylate type, prepared as described in U.S. Pat. No. 2,943,074 instead of that shown in Example VI. The product is collected as 0.125 inch thickness sheet of fair clarity and with isotropic properties. When 20 parts of PVC modifier KM-607-N (commercially available from Rohm and Haas Company) is employed as the modifier, a product of outstanding clarity is obtained.

EXAMPLE IX

A blend of 80 parts of PVC of high molecular weight (Diamond Alkali PVC 450), 20 parts of an impact modifier of the type described in U.S. Pat. No. 3,251,904, and 3 parts of barium-cadmium laurate are extruded by means of a single screw extruder and collected as sheet from a strand using a prototype model of the equipment shown in FIG. 10. The resulting sheet approaches isotropic properties when cooled slowly beyond the second nip. When the same composition is extruded by means of the system in which a die is employed, impact strength is isotropic but shrinkage is greater in the machine than in the transverse direction. A closer approach to isotropy is achieved when the composition is modified by substituting moderate molecular weight PVC (e.g., Diamond Alkali PVC 40) for the high molecular weight material.

EXAMPLE X

It is possible to apply a pattern to one or both surfaces of the sheet which is produced by means of the process described herein. Engraved belts may be employed. Alternatively, the sheet may be passed between heated engraved rolls subsequent to passage through the belts. Even more simply, papers embossed with the desired patterns may be fed to the nips at one or both sides of the sheet at the same time that the strand is being flattened in the nips. These patterned transfer papers are commercially available in many patterns (e.g., from S. D. Warren Company, Massachusetts) and may be reused as many as 5 or 10 times, so that the cost of applying the patterns becomes inconsequential. Separation of the papers from the cooled sheets is easy. In this manner, for example, hair cell pattern is applied to the second surface, when this procedure is applied to the compositions described in Example IX.

EXAMPLE XI

Film surfacing of extruded sheet and lamination of one or both sides of the sheet with thin sheets of the same or different compositions can be achieved. It is particularly advantageous when novel decorative effects are to be incorporated and when weather resistance of the substrate sheet can be improved by the use of a weatherable barrier membrane or of an ultraviolet light screening membrane. Combinations of these desirable effects can be achieved. Thus, for example, when commercially available (Rohm and Haas Company) transparent Korad ACV acrylic film is imprinted with a black skeleton wood grain pattern, and by passing over the top roll is laminated to the composition prepared in Example 9, in which brown pigments are incorporated, a strikingly realistic wood grained appearance is achieved without the necessity for a separate cementing operation.

Since an ultraviolet light absorber is incorporated in this film, it is useful for protecting less weatherable compositions, including those based on ABS, on PVC, and on polycarbonate.

Opaque films can be applied to sheet of the same or of different color. Material of the latter type is useful as engraving stock or to provide high chromic colored sheet without the necessity for use of large quantities of expensive colorants in the body of the sheet. Weatherable, non-chalking surfaces can be applied in the same manner as noted for transparent sheet above to sheet of the same or different color; in the former instance, scuff marks which cut through the film are not noticeable while in the latter case, work off of nondescript and mixed feeds can be achieved to give saleable products.

A diverse number of thermoplastic polymers, copolymers, and polymer blends have been described in connection with working examples I through X. Generally, the present invention may be usefully employed with a large plurality of polymers, including, and not limited to, the group consisting of:

poly(methyl methacrylate copolymers of methyl mechacrylate with up to 50 percent of lower alkyl acrylates, lower alkyl methacrylates, isobornyl methacrylate, styrene, and acrylonitrile; blends of said polymethacrylate homo and copolymers with multistaged acrylic and butadiene rubber impact modifiers; polyvinyl chloride; copolymers of vinyl chloride with up to 10 percent of such monomers as vinyl pivalate, vinyl acetate, ethylene and propylene; blends of vinyl chloride homo and copolymers with multistaged acrylic and butadiene rubbers, and with polymethacrylate homo and copolymers; acrylonitrile/butadiene/styrene and α-methylstyrene (ABS) plastics; acrylonitrile/styrene/acrylate (ASA) plastics; methyl methacrylate/acrylonitrile/butadiene/styrene (MABS) plastics; methyl methacrylate/butadiene/styrene (MBS) plastics; impact polystyrene blends; polyphenylene oxide; blends of poly(phenylene oxide) and polystyrene, impact polystyrene and multistaged butadiene rubber impact modifiers; polycarbonates; polysulfones; and poly[2,2-bis(4-hydroxyphenyl) propane isophthalate].

Those skilled in the art should now appreciate that this invention provides effective means for forming thermoplastic sheet free from imperfections caused by excessive shear forces induced by conventional slit dies and high pressure extrusion equipment. Furthermore, those skilled in the art should recognize that the thermoplastic sheet cooled and finished by the dual belt take-off system embodies in this invention has the dimensional stability and isotropic properties desirable in many commercial applications of the end product. Although the method of operation of the sheet forming and take-off apparatus of this invention has been described in terms of specified embodiments, it should be understood that the invention is not limited thereto since alternative embodiments will become apparent to those skilled in the art in view of this disclosure. For instance, the take-up system outlined herein can be used in conjunction with a conventional high pressure extrusion die without the use of an initial converging section. Although this method will not take advantage of the low pressure sheet forming concept, it nevertheless can produce sheet material of desirable physical characteristics. Another modification could be the use of only the lower member of the belt cooling section; thus, after the flattened melt sheet emerges from the sheet forming section, it can be conveyed and cooled by only the lower driven belt leaving the upper sheet surface exposed to atmospheric cooling. Accordingly, these and other modifications are contemplated, which essentially do not depart from the basic concepts of this invention.

We claim:

1. The method of producing plastic sheets having desirable surface characteristics, superior dimensional stability, and which approach isotropic properties, comprising the steps of:

a1. extruding through an adaptor a viscous, unplasticized thermoplastic polymer at low pressure in a temperature range above the glass transition temperature but below the degradation temperature of said polymer wherein a rope-like strand is continuously formed at a volumetric flow rate wherein said thermoplastic polymer is selected from the group consisting of:

poly(methyl methacrylate), copolymers of methyl methacrylate with up to 50 percent of lower alkyl acrylates, lower alkyl methacrylates, isobornyl methacrylate, styrene, and acrylonitrile; blends of said polymethacrylate homo and copolymers with multi-staged acrylic rubber impact modifiers; polyvinyl chloride; copolymers of vinyl chloride with up to 10 percent of such monomers as vinyl pivalate, vinyl acetate, ethylene and propylene; blends of vinyl chloride homo and copolymers with multistaged acrylic and butadiene rubbers, and with polymethacrylate homo and copolymers; acrylonitrile/butadiene/styrene and α-methylstyrene plastics; acrylonitrile/styrene/acrylate plastics; methyl methacrylate/acrylonitrile/butadiene/styrene plastics; methyl methacrylate/ butadiene/styrene plastics; impact polystyrene blends; polyphenylene oxide; blend of poly(phenylene oxide) and polystyrene, impact polystyrene and multistaged butadiene rubber impact modifiers; polycarbonates; polysulfones; and poly (2,2-bis(4-hydroxyphenyl) propane isophthalate);

a2. promptly delivering at said temperature range said strand to take-up means comprising juxtaposed endless conveyor belts which are adapted to take up the same and adhering thereto;

b. compressing, spreading and flattening the continuous strand between said take-up means by adjustment of the linear take-off rtake-up speed of said take-up means in relation to said volumetric flow rate;

c. driving said belts synchronously;

d. adjustably heating said belts in the zone of their intake nip within a temperature gradient ranging from above the glass temperature of the thermoplastic material being processed but below the deterioration temperature thereof;

e. maintaining the belt tension to compensate for variations in the belt length attributable to variable heating thereof, whereby the belts run true;

f. cooling both of said belts to a temperature below the glass temperature of said sheet to further allowing parting of said formed sheets without adherence to either belt; and g. taking off the resulting cooled polished polymer sheets from the discharge end of said belts.

2. The method as defined in claim 1 wherein said conveyor belts comprise stainless steel substantially free of imperfection that would leave undesired impressions on the formed sheets.

3. The method as defined in claim 1 wherein said cooling is accomplished by a belt cooling means comprising a plurality of air knives positioned intermediate to ends of said belts.

4. The method of continuously producing plastic sheets of desirable surface characteristics, superior dimensional stability, and which approach isotropic properties comprising:

a1. producing a continuous rope-like strand of a viscous thermoplastic polymer, at low pressure, in a temperature range above the transition temperature but below the degradation temperature wherein said strand is formed, said polymer selected from the group consisting of:
poly(methyl methacrylate), copolymers of methyl methacrylate with up to 50 percent of lower alkyl acrylates, lower alkyl methacrylates, isobornyl methacrylate, styrene, and acrylonitrile; blends of said polymethacrylate homo and copolymers with multi-staged acrylic rubber impact modifiers; polyvinyl chloride; copolymers of vinyl chloride with up to 10 percent of such monomers as vinyl pivalate, vinyl acetate, ethylene and propylene; blends of vinyl chloride homo and copolymers with multistaged acrylic and butadiene rubbers, and with polymethacrylate homo and copolymers; acrylonitrile/butadiene/styrene and α-methylstyrene plastics; acrylonitrile/styrene/acrylate plastics; methyl methacrylate/acrylonitrile/butadiene/styrene plastics; methyl methacrylate/butadiene/styrene plastics; impact polystyrene blends; polyphenylene oxide; blends of poly(phenylene oxide) and polystyrene, impact polystyrene and multistaged butadiene rubber impact modifiers; polycarbonates; polysulfones; and poly (2,2-bis (4-hydroxyphenyl) propane isophthalate);

a2. promptly delivering at said temperature range said strand to a take-up means comprising juxtaposed endless conveyor belts which are adapted to take-up the same and adhering thereto;

b. compressing, spreading and flattening the continuous strand between said take-up means by adjustment of the linear speed of said take-up means;

c. driving said belts synchronously;

d. adjustably heating said belts in the zone of their intake nip within said temperature range;

e. maintaining the belt tension to compensate for variations in the belt length attributable to variable heating thereof, whereby the belts run true;

f. cooling both of said belts to a temperature below the glass temperature of said sheet to further allow parting of said formed sheets without adherence to either belt; and g. taking off the resulting cooled polished polymer sheets from the discharge end of said belts.

5. The method as defined in claim 4 wherein said conveyor belts comprise stainless steel substantially free of imperfection that would leave undesired impressions on the formed sheets.

6. The method as defined in claim 4 wherein said cooling is accomplished by a belt cooling means comprising a plurality of air knives positioned intermediate to ends of said belts.

7. The method of continuously producing thermoplastic sheets of desirable surface characteristics, superior dimensional stability, and which approach isotropic properties comprising:

a1. producing at low pressure through an adapter a continuous strand of a thermoplastic polymer, in a temperature range above the glass transition temperature but below the degradation temperature wherein said strand is formed, said polymer selected from the group consisting of:
poly(methyl methacrylate), copolymers of methyl methacrylate with up to 50 percent of lower alkyl acrylate, lower alkyl methacrylates, isobornyl methacrylate, styrene, and acrylonitrile; blends of said polymethacrylate homo and copolymers with multistaged acrylic rubber impact modifiers; polyvinyl chloride; copolymers of vinyl chloride with up to 10 percent of such monomers as vinyl pivalate, vinyl acetate, ethylene and propylene; blends of vinyl chloride homo and copolymers with multistaged acrylic and butadiene rubbers, and with polymethacrylate homo and copolymers; acrylonitrile/butadiene/styrene and α-methylstyrene plastics; acrylonitrile/styrene/acrylate plastics; methyl methacrylate/acrylonitrile/butadiene/styrene plastics; methyl methacrylate/butadiene/styrene plastics; impact polystyrene blends; polyphenylene oxide; blends of poly(phenylene oxide) and polystyrene, impact polystyrene and multistaged butadiene rubber impact modifiers; polycarbonates; polysulfones; and poly(2,2-bis (4-hydroxyphenyl) propane isophthalate);

a2. promptly delivering at said temperature range said strand to a take-up means;

b. introducing said strand between juxtaposed and horizontally disposed, first and second flat endless polished conveyor belts, adapted to take-up same in a manner whereby said strand intimately contacts the nip of said belts and is compressed, spread and flattened there between by adjustment of the linear take-up speed of said belts;

c. providing a tapering down section, commencing at a point where said plastic strand enters the intake end of said belts;

d. providing an adjustable aperture subsequent to said section, whereby further compression and polishing of the flattened sheet is achieved as it travels through said aperture;

e. adjustably heating the tapering down section within a temperature gradient ranging from above the glass temperature of the thermoplastic material being processed but below the deterioration temperature thereof;

f. providing means to independently heat said adjustable aperture;

g. providing adjustable supporting means associated with at least one end of said belts to vary the sheet forming aperture defined between said moving belts in said tapering down section;

h. maintaining the belt tension to compensate for variations in belt length attributable to variable operating temperatures thereof; and i. taking off the resulting cooled polished polymer sheets from the discharge terminal of said belts.

8. The method as defined in claim 7 wherein the formed sheets are cooled and polished between a second pair of substantially parallel belts positioned to take up said melt sheet as it emerges from the sheet-forming section.

9. The method of continuously producing thermoplastic sheets of desirable surface characteristics; superior dimensional stability, and which approach isotropic properties, comprising:
   a. producing at low pressure through an adapter a continuous rope-like strand of a thermoplastic polymer in a temperature range above the glass transition temperature but below the degradation temperature of said polymer wherein said strand is formed, said polymer selected from the group consisting of:
   poly(methyl methacrylate), copolymers of methyl methacrylate with up to 50 percent of lower alkyl acrylates, lower alkyl methacrylates, isobornyl methacrylate, styrene, and acrylonitrile; blends of said polymethacrylate homo and copolymers with multistaged acrylic rubber impact modifiers; polyvinyl chloride; copolymers of vinyl chloride with up to 10 percent of such monomers as vinyl pivalate, vinyl acetate, ethylene and propylene, blends of vinyl chloride homo and copolymers with multistaged acrylic and butadiene rubbers, and with polymethacrylate homo and copolymers; acrylonitrile/butadiene/styrene and α-methylstyrene plastics; acrylonitrile/styrene/acrylate plastics; methyl methacrylate/acrylonitrile/butadiene/styrene plastics; methyl methacrylate/butadiene/styrene plastics; impact polystyrene blends; polyphenylene oxide; blends of poly(phenylene oxide) and polystyrene, impact polystyrene and multistaged butadiene rubber impact modifiers; polycarbonates; polysulfones; and poly (2,2-bis (4-hydroxyphenyl) propane isophthalate);
   b. introducing at said temperature range said strand between substantially parallel and horizontally disposed, first and second flat endless polished conveyor belts and adapted to take-up same in a manner whereby said strand emerges and firmly contacts said belts and is compressed, spread and flattened there between by adjustment of the linear take-off speed;
   c. adjustably heating the pressing section within a temperature gradient ranging from above the glass temperature of the thermoplastic material being processed, but below the deterioration temperature thereof;
   d. providing adjustable supporting means associated with at least one of said belts to vary the sheet forming aperture defined between said moving belts;
   e. maintaining the belt tension to compensate for variations in belt length attributable to variable operating temperature;
   f. cooling both of said belts to a temperature below the glass temperature of said sheet and to allow parting of said sheets without adherence to either belt; and
   g. taking off the resulting cooling polished polymer sheets from the discharge terminal of said belts.

* * * * *